United States Patent [15] 3,676,762
Saralidze et al. [45] July 11, 1972

[54] HIGH-VOLTAGE SEMICONDUCTOR RECTIFIER UNIT

[72] Inventors: Anton Lavrentievich Saralidze, ulitsa Sovetskaya, 87; Antoly Lazarevich Efremidi, ulitsa Antoneli, 18, both of Tbilisi, U.S.S.R.

[22] Filed: Oct. 26, 1970

[21] Appl. No.: 83,683

[52] U.S. Cl. ....................321/8 R, 321/11, 321/27
[51] Int. Cl. ....................H02m 7/00
[58] Field of Search ....................321/8, 11, 27

[56] References Cited

UNITED STATES PATENTS

| | | | |
|---|---|---|---|
| 3,123,760 | 3/1964 | Wouk et al. | 321/27 X |
| 3,128,421 | 4/1964 | Skellett | 321/11 |
| 3,398,351 | 8/1968 | Kuntke | 321/27 X |
| 3,445,747 | 5/1969 | Laurent | 321/8 X |

*Primary Examiner*—William H. Shoop, Jr.
*Attorney*—Waters, Roditi, Schwartz & Nissen

[57] ABSTRACT

A high-voltage semiconductor rectifier unit is provided which comprises a chain of series-connected diodes and by-pass capacitors disposed between common symmetrical metal screens so that each end of said chain is connected to a respective one of said common metal screens while the spacing between the end of the chain connected to one of common metal screens and the same screen increases at greater distances from said end of the chain. The diode chain can be divided into groups each group being disposed between symmetrical group metal screens.

4 Claims, 4 Drawing Figures

HIGH-VOLTAGE SEMICONDUCTOR RECTIFIER UNIT

The present invention relates to power supplies and, more particularly, to high-voltage semiconductor rectifier units used, for example, supply equipment of electric precipitators for gas cleaning, in converters for D.C. transmission lines, in electron-beam heating apparatus, in electric accelerators, and so forth.

There is known a high-voltage semiconductor rectifier unit comprising a chain of series-connected semiconductor diodes by-passed by capacitors, and a metal screen. The diodes are arranged helically on a cylindrical surface, while the screen is shaped as a truncated cone and is connected to the ungrounded end of the diode chain.

This known construction of a high-voltage semiconductor rectifier unit is adapted for equalizing the reverse voltages of the series-connected semiconductor diodes, but fast-rise voltages applied across the arms of the rectifier unit are not distributed evenly along the series diode chain because of the presence of randomly distributed capacitances between the separate diodes of the chain and ground.

This results in the overloading of the diodes which are located closer to the ungrounded end of the rectifier unit and, eventually, in their failure under dynamic conditions. The use of resistances and R-C networks in parallel with each diode does not provide even distribution of the reverse voltage under dynamic conditions, which is essential for converters.

The existing rectifier units are disadvantageous in that they are affected by the grounded components present nearby. This produces a randomly distributed capacitance to ground and affects sharing of the voltage among the diodes of the chain. Owing to this, such rectifiers units are made rather large in size and cannot be housed in a tank together with a high-voltage supply transformer.

Even distribution of the voltage under dynamic conditions cannot really be obtained with one screen as diodes with a higher reverse voltage rating have to be mounted at the ungrounded pole of the rectifier unit. When a large number of such rectifier units with varying screen potentials are employed in actual rectification circuits, the high-voltage units must be located at some distance from each other thereby increasing the overall size of the entire installation.

An object of the present invention is to obviate these disadvantages by providing a high-voltage semiconductor rectifier unit which is reliable in operation, provides better distribution of the voltage among the diodes of the unit and has smaller dimensions due to a new principle of screening.

With this and other objects in view, a metal screen of a high-voltage semiconductor rectifier unit consists, according to the invention, of at least two common symmetrical metal screens disposed on both sides of a chain formed by diodes and their by-pass capacitors, so that each end of the diode chain is connected to one of the common metal screens, while the spacing between the end of the chain and said screen increases at greater distances from this end of the chain.

Preferably, the diode chain is divided into groups, each group being disposed between two symmetrical group metal screens connected to the corresponding ends of the group, while all the screens are flat.

In the high-voltage rectifier unit described herein voltage is evenly shared by the separate diodes arranged in a series chain at any rate of change of the voltage applied to the rectifier unit so that the unit operates reliably under dynamic conditions.

Provision in the rectifier unit of definite distributed capacitances known beforehand and the fact that the diode chain is disposed between common metal screens render operation of the unit unaffected by the presence of capacitance at the near grounded components, thus making it possible to decrease the dimensions of the unit and enclose it in an oil tank together with a high-voltage transformer.

Further, the use of common and group metal screens permits a considerable reduction in the value of by-pass capacitors the function of which is performed by high-voltage ceramic pulse capacitors. This increases the rectification coefficient of the unit, decreases the power losses and, therefore, improves its efficiency.

The use of avalanche diodes makes it possible to dispose of by-pass capacitors altogether as the total capacitance of the group metal screens is sufficient for normal operation of the entire unit.

The new screening arrangement for a rectifier unit described herein permits semiconductor (silicon) diodes of comparatively low voltage ratings to be used in high-voltage installations rated at hundreds of kilovolts.

The invention will be best understood from the following description of a specific embodiment when read in connection with the accompanying drawings in which.

Figure 1:
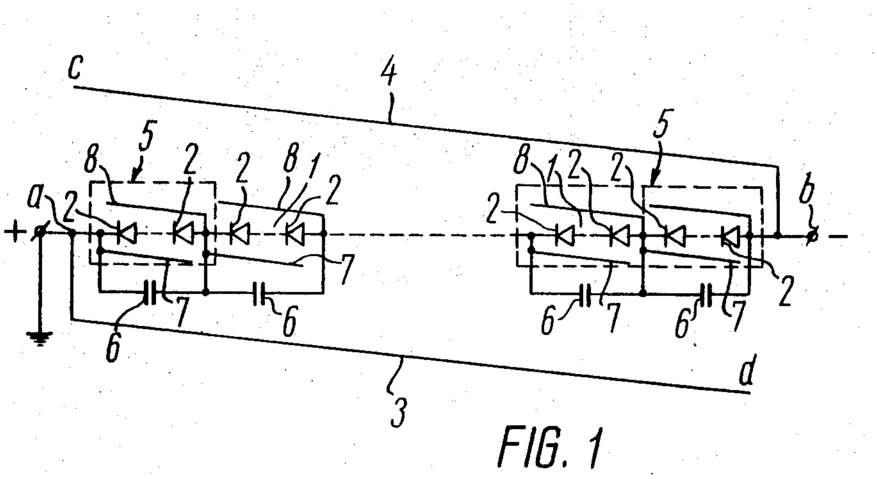
FIG. 1 is a schematic diagram of a high-voltage semiconductor rectifier unit, according to the invention.

The high-voltage semiconductor unit of the invention (FIG. 1) comprises a diode chain 1 formed by series-connected diodes 2 and disposed between two symmetrical common metal screens 3 and 4 so that an end "*a*" of the chain 1 is connected to the screen 3 and an end "*b*" of the chain 1 is connected to the screen 4. The total number of the diodes 2 in the chain 1 depends on the required output voltage of the rectifier unit. The chain 1 is divided into groups 5, the number of diodes 2 in each group being determined by the specific conditions of operation. Each group 5 is by-passed by a capacitor 6 and is disposed between two symmetrical group metal screens 7 and 8 connected to the corresponding ends of the groups 5.

To reduce the inductance between the diodes 2, the latter are arranged in one layer on one flat surface. The capacitors 6 are also arranged in one layer on the same surface.

The distributed capacitance between the common and group metal screens 3, 4 and 7, 8 varies along the chain 1 of the diodes 2 according to a definite predetermined law which is identical for both screens 3, 4 and 7, 8.

The required variation of said capacitances is obtained by changing the spacing between the common metal screens 3 and 4, between separate groups 5, between the group metal screens 7 and 8, and so forth.

The insulation between the end "*a*" of the chain 1 of the diodes 2 and the end "*c*" of the screen 4 (or the end "*b*" of the chain 1 and the end "*d*" of the screen 3) is selected in accordance with the maximum voltage of the rectifier unit.

The common and group metal screens 3, 4 and 7, 8 are disposed on two opposite longitudinal sides of the diodes 2.

Owing to the system of screening described herein, a fast-rise voltage applied to the high-voltage semiconductor rectifier unit will be evenly shared by all diode groups 5 and by all diodes within each group 5 as each group 5 will operate under the same conditions and will have a fixed capacitance to both screens 3, 4 and 7, 8.

Under normal conditions, the screens 3, 4 and 7, 8 will not produce any appreciable effect on the operation of the unit as their capacitances are very low.

Figure 4:
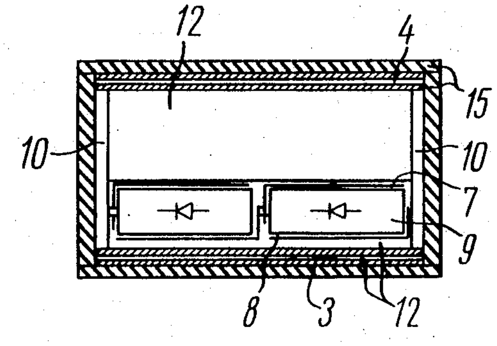
FIG. 4 is a sectional view taken on line IV—IV of FIG. 2.
Figure 2:
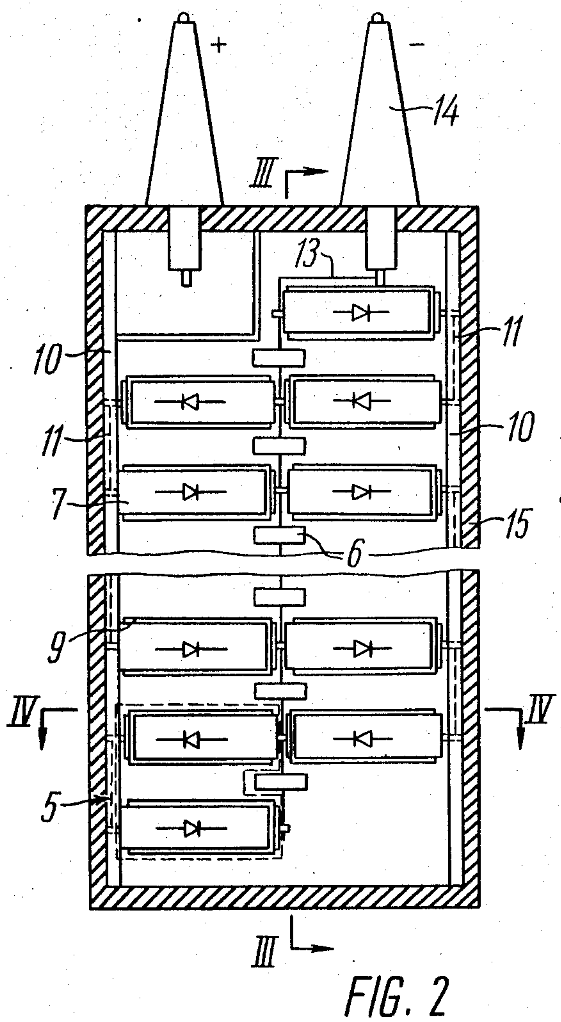
FIG. 2 shows one possible form of a high-voltage rectifier unit, according to the invention.
Figure 3:
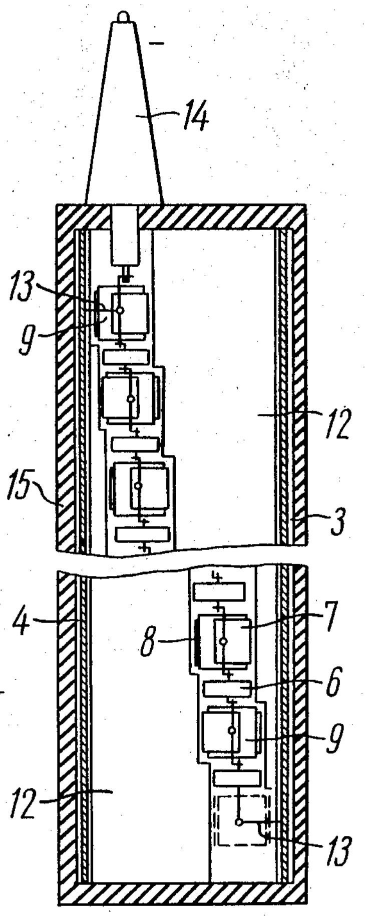
FIG. 3 is a sectional view taken on line III—III of FIG. 2.

One of the possible forms of a high-voltage semiconductor rectifier unit, according to the invention, is shown in FIGS. 2, 3 and 4.

Each group 5 comprising two epoxy-potted rectifier piles 9 is attached to insulation posts 10 and is disposed between group metal screens 7 and 8. The diodes 2 (FIG. 1) are connected in a series chain by jumpers 11 (FIGS. 2, 3, 4). The groups 5 are by-passed by the capacitors 6.

A stepped insulation part 12 is disposed between the common metal screens 3, 4 and group metal screens 7, 8 so that the diode which is under the highest potential has the thickest insulation and, simultaneously, minimum capacitance due to the fact that its insulation extends to the opposite screen. The common metal screens 3, 4 are electrically connected to the ends of the high-voltage semiconductor rectifier unit by jumpers 13 which are brought outside through bushings 14. The entire high-voltage semiconductor rectifier unit is enclosed in insulation case 15.

A similar construction can be realized when the rectifier unit is to be immersed in an oil tank together with a supply transformer. This makes it possible to dispense with the stepped insulation part 12, the bushings 14 and the insulation case 15. Cooling of the rectifier unit is thus no problem and the dimensions of the entire installation can be reduced still further.

In rectifier units of comparatively low voltage ratings, the rectifier piles 9 are disposed directly between the common metal screens 3, 4 without the group metal screens 7, 8.

By appropriately grouping and interconnecting separate high-voltage semiconductor rectifier units and arranging them so that their common metal screens, which are under the same potential, face each other, it is possible to obtain any rectification circuit used in practice either completely isolated from ground or with one grounded pole.

What is claimed is:

1. A high-voltage semiconductor rectifier unit comprising at least two common symmetrical metal screens, a chain of series-connected diodes and by-pass capacitors disposed between said common metal screens, said chain having opposite ends each connected to a respective one of said common metal screens, spacings being provided between the chain and each of the common metal screens each of which spacings increases at greater distances from the end connected to the screen associated with such spacing.

2. A high-voltage semiconductor rectifier unit as claimed in claim 1, wherein the diode chain is divided into groups having respective ends, comprising symmetrical group screens, each group being disposed between said symmetrical group metal screens, the latter said screens being connected to the corresponding ends of the group.

3. A high-voltage semiconductor rectifier unit as claimed in claim 1, wherein said common metal screens are flat.

4. A high-voltage semiconductor rectifier unit as claimed in claim 2, wherein said group metal screens are flat.

* * * * *